Oct. 20, 1970  E. GAMBERINI  3,534,873
AUTOMATIC DEVICE FOR HANDLING CAPSULAR BODIES
Filed Sept. 26, 1968  3 Sheets-Sheet 1

INVENTOR.
Ernesto GAMBERINI
BY
Albert Jonif
Agent

INVENTOR.
Ernesto GAMBERINI
BY
Agent Josif
Agent

United States Patent Office 3,534,873
Patented Oct. 20, 1970

3,534,873
AUTOMATIC DEVICE FOR HANDLING CAPSULAR BODIES
Ernesto Gamberini, Via Parco 1, Bologna, Italy
Filed Sept. 26, 1968, Ser. No. 762,881
Claims priority, application Italy, Sept. 28, 1967, 830,615/67
Int. Cl. B65g 59/06
U.S. Cl. 214—8.5   10 Claims

ABSTRACT OF THE DISCLOSURE

An automatic device for the withdrawal, orientation and feeding into conveyor receptor units of capsular bodies including a feed hopper containing capsular bodies, external members discharging into receptor units, driving means, a hollow support arranged between said hopper and said conveyer members for the receptor units, said hollow support being driven by said driving means in phase with said conveyor members, withdrawal tubes reciprocating in said hollow support coaxially with respect to the receptor units, orientation means for said withdrawal tubes, cyclic cam means for engagement with the withdrawal tubes and release means causing the capsular bodies to fall in said orientation means.

BACKGROUND OF THE INVENTION

This invention relates to an automatic device for handling capsular bodies such as, for example, the capsules widely used in the pharmaceutical industry. More particularly this invention relates to an automatic device for the removal and orientation, in a determined direction, of capsular bodies as well as the positioning of such capsular bodies within receiver units for their successive forwarding to other operative stations which do not form part of this invention.

In the pharmaceutical industry it is well known to introduce products, in suitable quantities, into capsular containers. These capsular containers are formed of two essentially cylindrical sections (having slightly different diameters from one another and each being closed at an end). The two cylindrical sections are adapted to form a lid and a bottom respectively and the open ends of said lid and bottom section are associated so as to enclose a product space.

Existing plants adapted to effect the filling and sealing of such capsules are provided, upstream of the stations performing said filling and sealing operations, with devices which remove the capsules from continuously capsule-fed hoppers and arrange them, for the successive filling and sealing operations, inside reciver units which are all arranged in the same direction.

In general these devices work intermittently due to the fact that the orientation of the single capsules proceeding from the hopper is effected by pusher members co-operating with cavities dimensioned according to the dimension of the capsules, said pusher members being operated with reciprocal motion. In such manner the presence of different operative phases occurring in rest conditions involves a high incidence of time loss in the machine cycle and evidently unfavourably affects the output.

The devices, which in the known units perform these functions, present difficulties in relation to their adaptation for capsules of various types and sizes.

The main object of this invention is that of avoiding the difficulties of known types and provide an automatic device for the removal, the orientation and feeding in receiver units of capsular bodies which has a high production capacity as a result of an acyclic continuous working.

Another object of this invention is that of providing a device wherein the arrangement of parts is such as to allow a rapid removal and partial or total disassembly in order to be able to be adapted to capsules of different dimensions and types and in order to render the maintenance and cleaning of the single parts as easy as possible, which latter is of considerable importance in relation to the type of products to be treated.

Another object of this invention is to provide a device which may readily associate or co-operate both with intermittently or continuously operated pre-existing plants for the filling and the sealing of the capsules and at the same time be capable of operating with the necessary care on said capsules.

A further object of this invention is that of providing a device which is of simple arrangement, of ready manufacture, of sure and efficient working as well as being capable of automatic operation.

SUMMARY OF THE INVENTION

These and other objects which will better appear hereinafter are achieved by an automatic device for the withdrawal, orientation and feeding into conveyor receptor units of capsular bodies which comprises a feed hopper adapted to contain said capsular bodies, receptor units supplied by external conveyer members, driving means, a hollow support arranged between said hopper and said conveyer members for the receptor units, said driving means being adapted to drive said hollow support in phase with said conveyer members, a series of withdrawal tubes guided with vertical reciprocal motion on said hollow support and co-axial with respect to the receptor units, movable orientation means arranged at the lower ends of said withdrawal tubes and adapted to rotate with the support and adapted to co-operate with pusher means and conveyer means for the capsular bodies, cyclic cam means kinematically engaging the withdrawal tubes as well as release means adapted to determine the fall of single capsular bodies in said orientation means.

DESCRIPTION OF THE PREFERRED EMBODIMENTS

Figure 1:
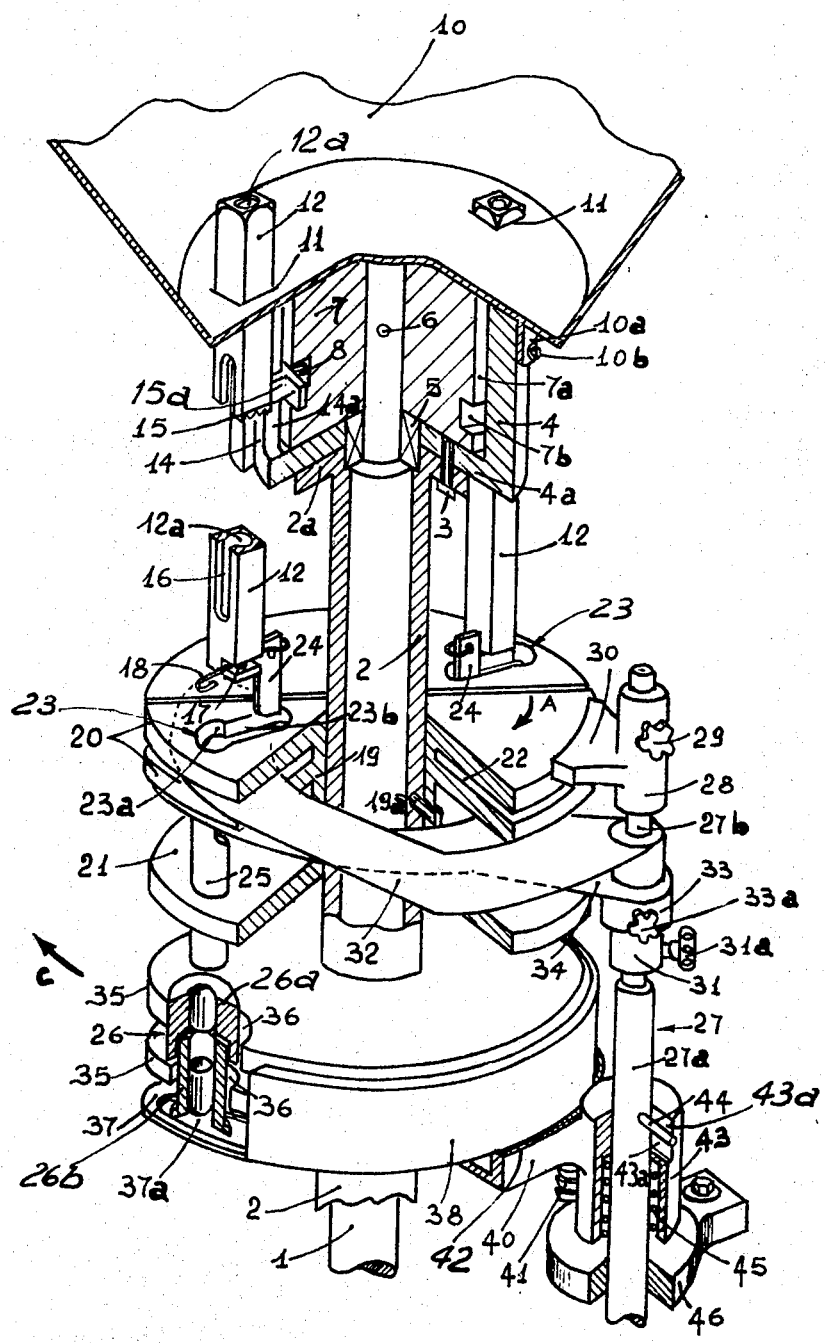
FIG. 1 shows a perspective and partly sectioned view of a first embodiment of the device according to the invention for the removal, the orientation and the feeding of capsules.

With reference to FIG. 1, the device according to the invention comprises a vertical shaft 1 secured to the framework of the operative unit (not shown). On said shaft 1 is mounted a sleeve 2, supported by base pins (not shown), and terminating in its upper section with a flanged ring 2a. Said flange 2a iis connected by screw means 3 to an annular base 4a of a drum member 4 which is co-axial with respect to the shaft 1. The sleeve 2 and the drum 4 receive a continuous rotational motion about the shaft 1 through a cog wheel unit which, for clarity, has not been shown in the figure.

In proximity with said flanged ring 2a the shaft 1 has a section of reduced diameter. A shoulder is thus formed on the shaft 1 at the junction of the sections with different diameters. Anti-friction bearing means (for example ball bearings) 5 rest on said shoulder and are interposed between the shaft 1 and the parts 2a and 4a.

On the end of the smaller diameter section of the shaft 1 a cylindrical body 7 is mounted by means of a pin 6.

Figure 3:
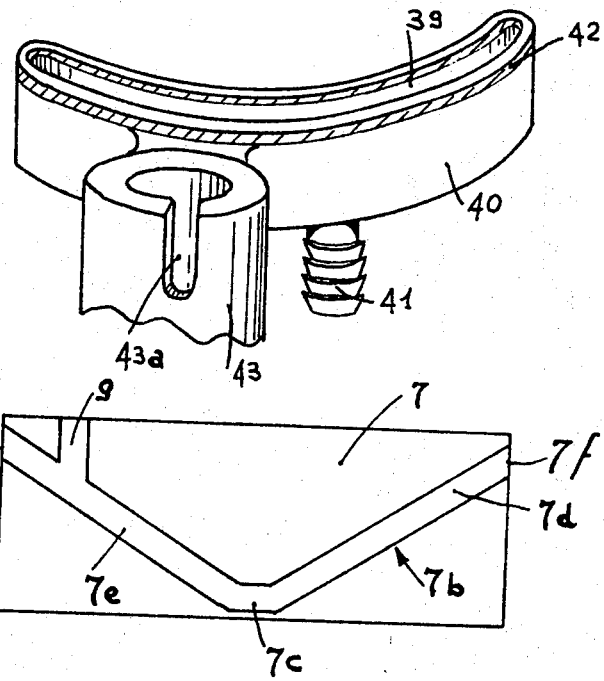
FIG. 3 shows the development of control members of the device according to FIG. 1.

The cylindrical body 7 is contained within said drum 4 and an annular space 7a is formed therebetween. On the outer surface of said cylindrical body 7 is produced a grooved channel 7b, shaped as shown in FIG. 3. The channel 7b forms a guide cycle which defines the path of motion of various rollers 8 engaged therein and connects, as will be seen hereinafter, with removal tubes. Said channel 7b has, in its development, an upper maximum point and a lower zone 7c which are inter-connected by constant inclined sections 7d and 7e. Moreover there is provided an axial duct 9 which connects with the channel 7b.

Above the drum 4 a hopper 10 is co-axially secured to the shaft 1 by means of screws 10b and associated nuts 10a. Inside said hopper 10 capsular bodies are loaded in disorder. The base of the hopper 10 peripheraly projects with respect to the drum 4 and in such zone has, at least at the opposite ends of one diameter, holes 11. In each of said holes 11 the upper end of a tube 12 is mounted. Said tubes 12 extend parallelly to the rotation shaft 1 and form removal tubes.

The internal cavity 12a of each of said tubes 12 is slightly flared in its upper section in order to permit the entrance and free fall of said capsular bodies one at a time and in vertical orientation.

These capsular bodies are contained in random or loose manner in the hopper 10 and may thus enter the tubes 12 either with their caps 13a or their bottoms 13b uppermost.

The drum 4 is peripherally provided with longitudinal guide grooves 14 for said tubes 12, each of said grooves having a slot 14a communicating with the space 7a and being upwardly open. In each of said slots 14a is inserted a shank 15a rigid with said tube and terminating with a finger piece 15 contained in the gap or interspace 7a and pivotably carrying a roller 8, which engages in the channel 7b and imports a vertical reciprocal motion to the relative tube 12.

On the outer side the tube 12 has an inspection window 16 and near the lower end a horizontal slot 17, in which a flexible arm of a spring 18 is engaged. The spring 18 forms crossing the aperture 12a of the tube 12, a removable obstruction.

Screw means 19a secure a pair of co-planer semi-sleeve element 19 to the median part of said sleeve 2. Said pair of semi-sleeve elements 19 is provided in its upper section with a pair of parallel semi-discs 20, which form part of the orientation unit, and is provided in lower section with a perspective semi-disc 21. The height of the semi-disc 20 (separated by an interspace 22) is substantially equal to the height of the capsules to be orientated. Said semi-discs 20 have, diametrically opposite slots 23 which lie beneath said tubes 12. Each of said slots is peripherally provided with a first circular part 23a, having an aperture substantially equal to the internal aperture of the tubes 12, and a second part 23b which projects inwardly and radially. Such part 23b has a width such that the introduction therein of the bottom of a capsule requires a slight pressure whilst the introduction of the lid of the capsule would require a considerably greater pressure. A relative pusher member 24 rigid with a lower end of said tubes 12 is lowerable in the part 23b. Conveyor tubes 25 are mounted in said semi-disc 21, each tube 25 being co-axial with one of said tubes 12. Said tubes 25 have a fluted upper entrance and extends to a receiver unit generally indicated at 26.

Peripherally to said semi-disc elements is provided a vertical shaft 27 which is secured to the base of the machine. On the upper section 27b of said shaft 27 is co-axially mounted a sleeve member 28. Said sleeve 28 is positioned by means of an adjustable screw 29 and has an inward lateral extension 30 which is adapted to engage the free end of said spring 18 and thus remove the obstruction of the tube 12.

A further sleeve member 31, lower than said sleeve 28 is mounted on said shaft 27, and is adjustable in height by means of an adjustable screw 31a. The upper section of said sleeve 31, is fast with a horizontal blade or knife member 32 which is inserted in the interspace 22. As to the rotation direction of the semi-discs (rotation direction indicated in FIG. 1 at arrow A) the blade 32 extends in the interspace 22 in such manner as to face a peripheral portion of the discs downstream said extension 30 with the free end thereof at said slot 23.

On the sleeve 31 is mounted a sleeve member 33, adjustable by means of a screw 33a, which supports a support blade 34. Said support blade 34 is positioned beneath the disc 20 and is of lesser extension than the blade 32.

The previously mentioned receiver unit 26 comprises two superimposed bushings. The first of said bushings has an axial cavity which is slightly narrowed in its lower section so as to form a stop for the capsule top, in manner such that the capsule bottom may be inserted in the lower bushing in which is of greater axial extension and has a narrowing in its lower section adapted to prevent the exit of the capsule bottom.

Figure 2:
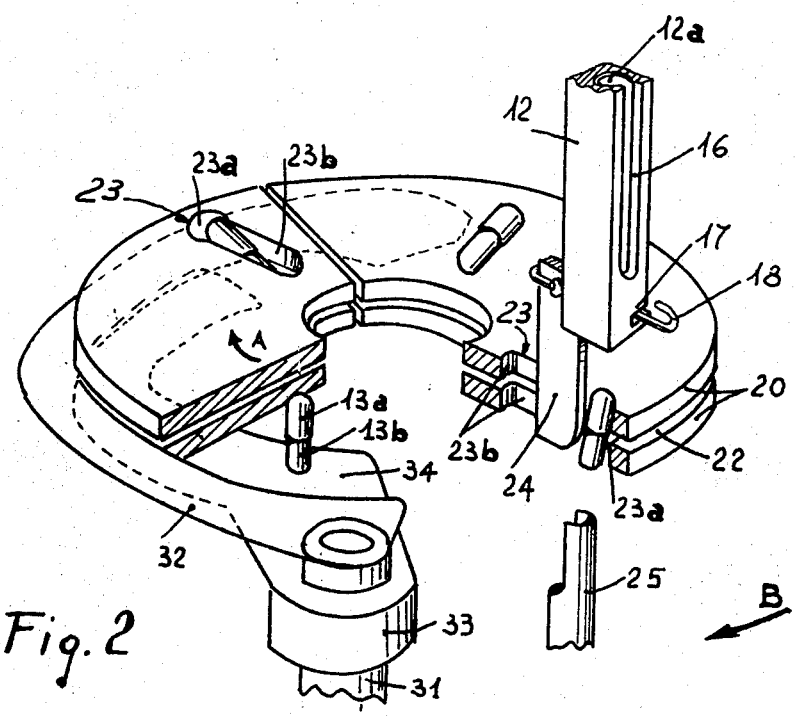
FIG. 2 shows a perspective view of the cycle of the device of FIG. 1.

Transport members are provided for the receiver unit 26 which comprises a pair of rotating discs 35 having, on the same vertical as the conveyor tubes 25, shaped recesses 36. Thus the upper of the pair of discs 35 engages the upper bushing of the receiver unit 26 and the lower disc 35 engages the lower of these bushings. The receiver unit is supported on a ring member 37. The discs 35 and 37 are rigid with the sleeve 2. The supplying of the receiver unit 26 occurs by means of a suitable rotary or coplanar distributor (not shown in the figures) at the position indicated by the arrow B (FIG. 2) while the release of the filled unit will occur in the position indicated with the arrow C (FIG. 1). A removal distributor of known type determines the disengagement of the two bushings 26a and 26b so that the bottom of the capsule arranged therein may be filled.

The bushings are peripherally associated to the two discs 35 and to prevent the exit of the bushings from said shaped recesses 36 a shoulder 38 is provided. Said shoulder 38 is positioned along an external arc of said discs 35, and is secured to the base of the machine. The support ring 37 is peripherally provided with slots 37a vertically beneath the recesses 36. In such arc in proximity of the periphery of the ring 37 is positioned an entrance 39 (FIG. 2) of a sector 40 of U-shaped cross-section. The interior of said sector 40 communicates through a union 41, adapted for coupling with a tubular member (not shown), with known suction means. The arrangement is such that the suction action, applied with predetermined intermittance, causes the release of the bottom 13b of the capsule from the relative top 13a and the displacement of the bottom 13b to the bottom of the relative lower reception bushing 26b.

The edge of the entrance 39 is provided with a resilient hydraulic seal 42.

The suction sector 40, which extends substantially upstream of the shaft 27, is borne by a sleeve 43 mounted on the lower part 27a of said shaft 27. The sleeve 43 is guided on said shaft 27 by a pin 44 radially projecting from the shaft 27 and inserted in a slot 43a formed in the sleeve. The sleeve 43 is spring biased by means of a spring 45. The spring 45 is surrounded by the sleeve 43 and is retained between an internal shoulder of said sleeve and a fixed stop formed by a nut 46 mounted on the shaft 27 and secured to the base of the machine.

The working of the above described device will now be described. The stationary shaft 1 is secured to the basement of the unit and the bushing 7 is rigidly secured to the shaft 1. The sleeve 2 is driven by means not shown and, during its rotation entrains in rotation the support 4, the removal tubes 12, the semi-discs 20 and disc 21 as well as the member 37. By means of the relative movement between the bushing 7 and the support 4, the removal tubes 12, engaged (as above described) in the groove 7b, receive a vertical reciprocal movement. The upward vertical movement also facilitates the introduction of the capsules in the removal tubes 12.

The capsules are thus conveyed in the slot 23 positioned downstream and before the said receiver units. For simplicity the travel of only one capsule will be considered since all the capsules, apart from the number of removal pipes, are always subjected to the same orientation process.

Every time during the rotation the lateral extension 30 engages a spring 18, the latter frees for the instant of engagement, the opening of the relative channel 12a so that a capsule falls into slot 23. When the engagement between the lateral extension 30 and the spring 18 terminates the latter once again closes the opening of the channel 12a and thus prevents the exit of any other capsule until the next engagement. Now irrespectively of whether the top or the bottom of the capsule is presented in the part 23a of the slot 23, the capsule will in every case be arranged either in the seat of the upper semi-disc 20 or the seat of the lower semi-disc 20, with the capsule bottom facing the sleeve 2, as a result of the intervention of the shaped blade 32 resting stationary.

Following to successive descent of the tube 12, its pusher 24 will act on the bottom of the capsule causing it to assume a vertical position with its bottom lowermost and, by gravity, through the conveyor tube 25 it will enter the receiver unit 26 previously fed by known devices (not shown). Immediately afterwards the lateral extension 30 causes another capsule to fall.

By the use of suitable suction through the pipe 41 the separation of the capsule top 13a from the capsule bottom 13b is effected in order to enable the subsequent filling and sealing operations by other devices of the plant (not shown).

Figure 4:
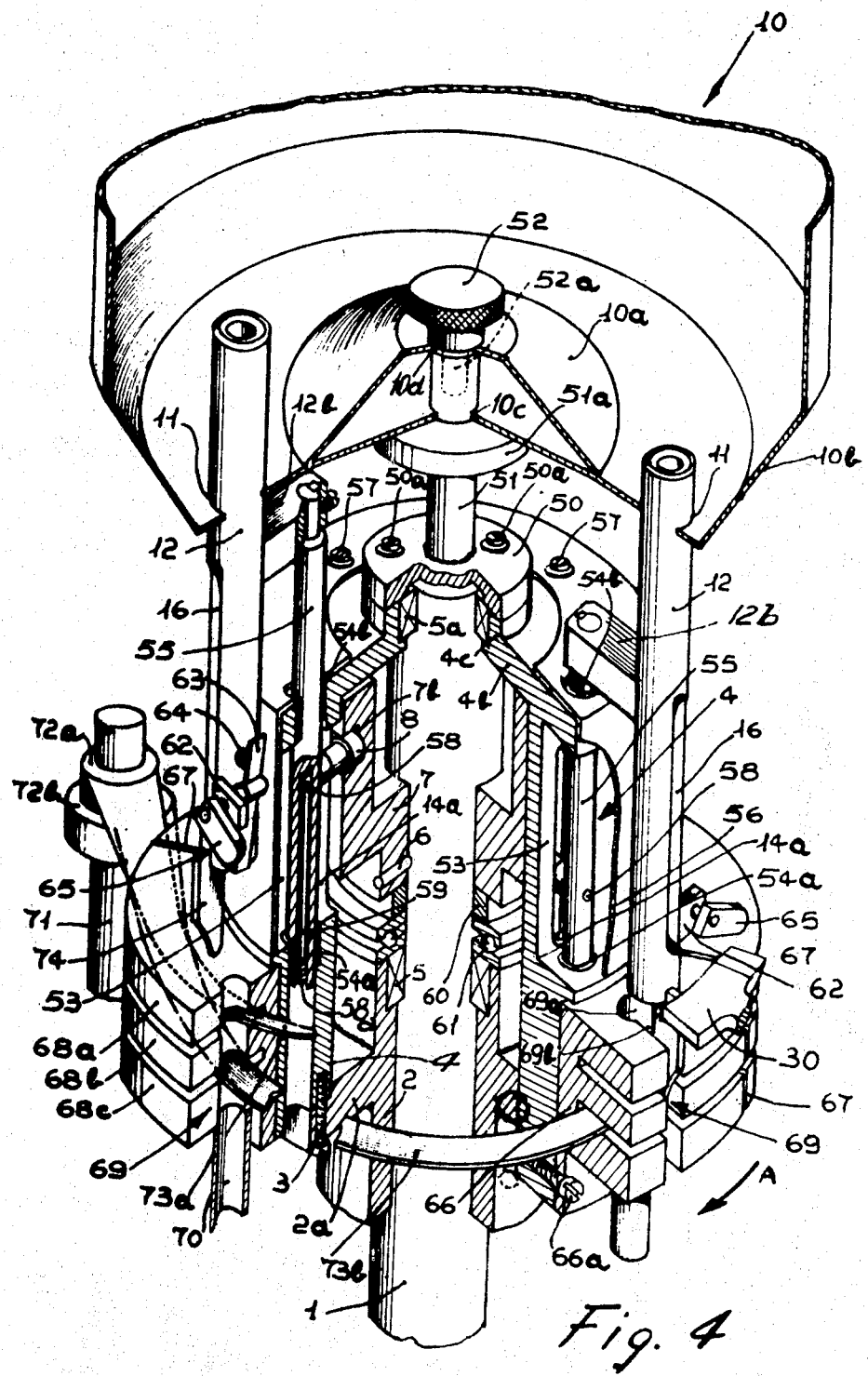
FIG. 4 shows another embodiment of the device according to the invention.

With reference to FIG. 4, there is illustrated a further embodiment of the device which allows a higher output per hour and easier replacement of portions to be achieved. The device according to FIG. 4 can also be adjusted according to the size of the capsules to be orientated.

With this device moreover any possibility of contamination of the capsules with the lubricants employed in the device is excluded.

In FIG. 4 the parts already described in relation to the first embodiment retain the same reference numbers. The device comprises a vertical shaft 1 secured to a supporting structure not shown. Around this shaft a sleeve 2 is arranged which is driven in the direction indicated by the arrow A by driving means, not shown. On the shaft 1 is mounted a sleeve 2 which is provided with a flange 2a and provides seats for the housing of ball bearings 5 (of which only the upper one is visible) which remain interposed between the shaft 1 and the sleeve 2.

The flange 2a supports a drum support generally indicated at 4 and secured to said flange by screw means 3. The drum 4 has an upper annular end 4a which centrally defines a collar 4c bounding the housing of the bearing 5a which is interposed between said collar 4c and said shaft 1, near the upper end of said shaft.

In the upper zone of said drum 4, between the drum and the shaft 1, a cylindrical body 7, is mounted on the shaft 1 by means of pin 6. Said body 7 has a closed grooved channel 7b. As in the case of the first embodiment described, this grooved channel 7b is of development such as that shown in FIG. 3 and provided a guide for various rollers 8, engaged therein, during the relative rotation of the body 7 and the drum 4.

A lid 50 covers the collar 4c and is connected to the latter by means of screws 50a. Rigid with said lid 50 is provided a shaft 51 which, projecting above the drum 4, carries a plate-like member 51a adapted to support the base of a hopper 10. In said hopper 10 are stored the disordered capsules for orientation. The bottom centre of the hopper 10 has a part which has the form of a truncated cone, the sides of said cone converging upwardly. The extension of said shaft 51 passes through a hole 10c in the base and extends into a hole 10d provided at the top of said truncated cone section 10a. At this point a hand grip 52 locks the hopper to the shaft by means of its threaded shank 52a which is screwed into the top of the shaft. Towards the base of the hopper 10 the lateral surface 10b also has a truncated cone form. Thus capsules in the hopper are forwarded towards a sort of flared annular canal.

At the bottom of such canal are distributed holes 11 (in the figure, for clarity, only two are shown). The upper ends of the said series of removal tubes 12 (parallel to the shaft 1 and external to the support 4) are inserted and guided in said holes 11. The removal tubes 12 have flared upper entrances and an inspection window 16. As in the previously described embodiments each tube 12 has an internal longitudinal channel such that a capsule may slide along by means of gravity and orientated according to its longitudinal axis.

The upper and external surface of the drum 4 is provided with an externally opened groove 53. In the side shoulders defined by said groove 53, a set of co-axial seats 54a and 54b are formed parallelly to shaft 1. Guide rods 55 slide in said seats with anti-friction bushings interposed therebetween. A packet 56 surrounds drum 4 to close the groove 53 and at its upper part is secured to said drum by screw means 57.

At about the median zone of each of the shafts 55 there is provided a pin 58 which remains locked to the shaft 55 by the pressure exercised by the end of a rod-like member 59. Each pin 58 has a shank, which is inserted in a longitudinal cavity obtained in the lower part of the shaft 55, and a head 58a which is screwed to the shaft itself. The shank of the pin 58 penetrates the interior of the drum 4 through the corresponding slot 14a of a series of slots. Said slots 14a develop axially and are produced on the lateral surface of the drum 4 near the groove 53a. At its inner end each pin 58 carries a relative roller 8. Between the shaft 55 and said roller 8 a bush is mounted on the pin 58, which is adapted to engage the edges of the slot 14a.

On the upper end of each shaft 55 is keyed, by means of a key and locking screws, a transverse element 12b rigid with the relative removal tube 12.

Between the lower end of the cylindrical body 7 and the upper end of the sleeve 2 a distance ring 60 and a thrust bearing 61 are interposed.

At the lower end of each tube 12 is rigidly provided a lug or tongue which is parallel to the drum 4 and faces upstream (with respect to the direction of rotation, indicated in the figure by the arrow A). On said tongue 62 is mounted a spindle about which a lever 63 rotates. The lower end of said lever 63 is hook-shaped and passes though a slit provided in the bottom rim of the tube 12 so as to close said tube.

In fact, on the opposite side with respect to the hook the lever 63 is spring-loaded by means of a spring 64 provided between the lever and the pipe 12. The spindle mounted on said tongue 62 carries, on the end opposite to said lever 63, a rigidly mounted arm 65 designed to be actuated by the lateral extension 30. The arm 65, secured to members rigid with the framework of the machine, is maintained at the periphery of the drum 4 in an angular position such that the release of a capsule (positioned at the end of the tube 12) occurs in the desired moment.

Below the groove 53, externally to the drum 4, semi-bands 66 are secured by means of screws 66a. Integrally with said semi-bands 66 are provided semi-rings 68a, 68b and 68c. The semi-bands and semi-rings surround the drum 4 and are arranged near an edge 67 in manner such as substantially to form three superimposed externally projecting rings in the lower part of the drum 4. The three rings are slightly spaced apart and are such that two adjacent rings together have a height substantially equal to that of a capsule. Said rings are provided with a series of axially superimposed slots 69. These slots are similar in shape to the slots 23 of the previously described embodiment. Each slot 69 is formed of a first circular section 69a and an elongate section 69b. The section 69a is (as in the case of the slots 23) co-axial with the relative tube 12 while the elongate section 69b in this embodiment, extends outwardly and is opened at the external circumference of the relative rings. Beneath the rings 68a, 68b and 68c and co-axial with the circular section 69a of each slot 69 is positioned a conveyer tube 70 which carries the capsule already oriented in the desired direction, to a receiver unit 26 as indicated in FIG. 1.

On a rod 71 rigidly mounted on the framework of the machine and parallel to the periphery of the said rings, are mounted two sleeves 72a and 72b. Said sleeves 72a and 72b are integral with laminar blade members 73a and 73b respectively. The blade 73a is inserted between the rings 68a and 68b and the blade 73b is inserted between the rings 68b and 68c. The blade 73b has a greater length than the blade 73a. The blades 73a and 73b both extend from the support rod 71 in a direction opposite to that the arrow A and follow, for a portion, the arcate development of the rings 68a, 68b and 68c.

On the lower end and on the externally facing side of each tube 12 a blade-like pusher 74 is provided. Said pusher 74 is adapted to penetrate the relative group of slots 69 in proximity of the portions 69b. The end section of said pusher 74 is beak-shaped; it tapers with a concave portion unto a sharp point in proximity to the internal edge of the section 69a of the slots 69.

The principle of the working of this embodiment of the device according to the invention is similar to that of the previously described embodiment so that the description will be limited to the new conformation of the orientated part.

Once again, for the sake of clarity, only a single capsule will be considered.

When a capsule falls into the portion 69a of the slot 69 it is supported by the blade 73b. Then, as a result of the rotation of the device, the capsule is pushed into the portion 69b of the slot by means of the blade 73a. The lid-portion of the capsule finds difficulty (due to its greater diameter) in entering the portion 69b. Therefore the capsule rotates thus positioning according to ring 68a, if its bottom is low, and according to ring 68b, in the opposite condition.

In either case the bottom of the capsule will, in the setting of the capsule according to one of the discs, be caused to face outwards. During its downward stroke, the pusher 74 enters the portion 69b of the slots 69, causing the capsule to rotate once again. Then since the capsule has no lower support; it enters the tube 70 bottom first.

Successively there occurs the release of another capsule from the removal tube 12 and the above-described orientation operations are repeated.

It may be noted that if a capsule formed of two lid sections (instead of a lid section and a bottom section) should be discharged from the tube 12, as may sometimes be the case, the blade 73a will push the thus malformed capsule into the portion 69b of the slots 69 without rotating it. Then the beaked portion of the pusher 74 will cause the rejection of the capsule from the rings. This also occurs every time a capsule, for some abnormal situation, is not arranged in the slots in the desired manner. However it is extremely easy to provide for the removal of obstacles from the periphery of the rings.

As may be noted, the indirect actuation of the removal tubes and the peculiar conformation assumed by the unit is such as to prevent any danger of lubricants inside the drum coming into contact with the capsules at any stage.

One may also note the perfect efficiency of the device adapted for the release of the capsules from the exit of the removal tubes.

The invention as thus conceived is subject to numerous modifications and variations within the scope of the appended claims.

All the members may be replaced by other technically equivalent means and all the materials used, as well as the dimensions, may be varied according to the requirements of use.

I claim:

1. An automatic device for the withdrawal, orientation and feeding into conveyer receptor units of capsular bodies which comprises a feed hopper adapted to contain said capsular bodies, receptor units supplied by external conveyer members, driving means, a hollow support arranged between said hopper and said conveyer members for the receptor units, said driving means being adapted to drive said hollow support in phase with said conveyer members, a series of withdrawal tubes guided with vertical reciprocal motion on said hollow support and co-axial with respect to the receptor units, movable orientation means arranged at the lower ends of said withdrawal tubes and adapted to rotate with the support and adapted to co-operate with pusher means and conveyer means for the capsular bodies, cyclic cam means kinematically engaging the withdrawal tubes as well as release means adapted to determine the fall of single capsular bodies in said orientation means, said hollow support being formed of a drum rotatably mounted on a vertical fixed support shaft and provided with axial peripheral slots adapted to guide said withdrawal tubes, the upper ends of said tubes being inserted in holes formed in the base of said hopper.

2. A device according to claim 1 wherein said cyclic cam means comprise a cylindrical member with a peripheral guide channel, said cylindrical member being rigidly secured to said support shaft and contained inside support 4, said guide channel being adapted to transmissively engage guide members rigidly and radially provided on said withdrawal tubes, said guide members passing through slits longitudinally provided in said peripheral slots.

3. A device according to claim 2 wherein said withdrawal tubes are provided with an internal axial channel such as to permit the orientation in vertical position of capsular bodies removed from said hopper, said withdrawal tubes being provided in their lower sections with closure members having projecting members adapted to control the momentary displacement of said closure members.

4. A device according to claim 3 wherein said orientation means comprise a triple ring co-axially associated to said hollow support in fixed rotary manner, said rings of said triple ring being separated from each other in manner such that any two aligned rings have a height substantially equal to that of the capsules, said triple ring having a series of diametrically opposite slots formed of a first circular part co-axial with said withdrawal tube and with a width substantially equal to that of the axial channel provided in said withdrawal tubes and a second part extending radially inwardly of the rings, said second part having a width slightly less than the transverse dimension of the cap of said capsular bodies a first blade member being associated to the two uppermost of said rings in manner such as to be able to pass between them and intersect an arc thereof, said first blade member being curved inwards with respect to said rings, a second blade member being associated to the two lowermost of said rings adapted to be displaceable for the closure of the relative slots, said blades being rigidly supported on the filed framework of the machine and both extending in the direction opposite to that of the rotation of the device.

5. A device according to claim 1 wherein said hollow support is formed of a drum having an annular peripheral external guide channel with a substantially C-shaped cross-section, said guide channel having a plurality of diametrically opposite seats adapted to allow the vertical sliding of intermediate members which transmissively connect said cyclic cam means with guide rods fast with said withdrawal tubes, said sliding guide seats produced in the parallel sides of said guide channel, said hollow support being externally closed by a cowling and supporting, in its upper part, releasably associated to the said hopper member, the ends of each of said intermediate members having a pin-like form and being inserted in a seat formed in said guide rods, each said member being secured to a rod by a locking pin inserted in the upper end of said guide rod and adapted to be associated to the latter by means of its threaded end.

6. A device according to claim 4 wherein said pusher means comprise plate-like members projecting below the withdrawal tubes and adapted to penetrate into the said second part of said slots during the downward movement of said withdrawal tubes and adapted to cause said capsular members to assume a vertical position and fall by gravity into said conveyers, the lower end of said plate-like members being externally convex.

7. A device according to claim 1 wherein said orientation means comprise a pair of horizontal discs rotably rigid with said hollow support and mutually spaced in manner such as to define a height substantially equal to that of the capsular bodies and having, diametrically opposite, slots with a first circular part co-axial with and having the same width as said axial channels and a second oblong part arranged radially inwards and having a width slightly less than the bases of capsules and moreover comprises, rigid with the framework of the machine, a first blade member penetrating the interspace between said two discs and intersecting a peripheral sector of said latter members, and a support blade member associated, in its lower section, to the lower disc, as well as conveyer means supported fixed to the framework co-axially with respect to said withdrawal tubes and terminating slightly above said receiver units, said orientation members co-operating with said pushing members the latter comprising a laminar member projecting below said withdrawal tubes and adapted to penetrate, with the downward movement of said tubes, into the oblong part of the slot so as to determine the vertical arrangement of the capsular body and the relative falling under gravity into the conveyer, the lower edges of said laminar member being slightly rounded.

8. A device according to claim 3 wherein said closure members comprise a spring-biased rod-like member intersecting, in rest condition, the lower end of said withdrawal tubes, said spring-biased rod-like member being adapted, as a result of its temporary engagement with said fixed stop member, to temporarily free said lower end of the withdrawal tubes, and thus allow the fall of one single capsular body.

9. A device according to claim 3 wherein said closure members comprise a plate supported so as to be free to oscillate on a shaft connected to an intervention lever, said shaft being supported so as to be free to rotate on the withdrawal tube, and said plate being spring-biased at its upper end and crossing, with its lower angled end, the exit aperture of the withdrawal tube.

10. A device according to claim 7 wherein said discs are formed of coplanar semi-discs secured together to form a disc.

References Cited

UNITED STATES PATENTS 3,103,165   9/1963   Tripp.
3,407,964   10/1968   Wysocki.

GERALD M. FORLENZA, Primary Examiner

G. F. ABRAHAM, Assistant Examiner

U.S. Cl. X.R.

198—33; 221—225